HALF-TONE SCREEN FOR COLOR SEPARATION

Original Filed Oct. 26, 1953 2 Sheets-Sheet 1

INVENTOR
HAROLD BRENT ARCHER

Cumpston + Shaw

HIS ATTORNEYS

HALF-TONE SCREEN FOR COLOR SEPARATION

Original Filed Oct. 26, 1953 2 Sheets-Sheet 2

INVENTOR
HAROLD BRENT ARCHER

Cumpston + Shaw

HIS ATTORNEYS

United States Patent Office

Re. 26,058
Reissued July 5, 1966

26,058

HALF-TONE SCREEN FOR COLOR SEPARATION

Harold Brent Archer, Henrietta, N.Y., assignor to Rochester Institute of Technology, Rochester, N.Y., an educational and non-profit corporation Original No. 3,085,878, dated Apr. 16, 1963, Ser. No. 764,089, Sept. 29, 1958, which is a continuation of Ser. No. 388,126, Oct. 26, 1953. Application for reissue May 7, 1963, Ser. No. 279,047
25 Claims. (Cl. 96—118)

Matter enclosed in heavy brackets [ ] appears in the original patent but forms no part of this reissue specification; matter printed in italics indicates the additions made by reissue.

The present invention relates to screens used in color photography, and more particularly to screens used in making direct, color-separation, half-tone negatives, one object of the invention being to provide a screen of the above nature having a more practical and efficient construction and mode of use.

An analysis of the color copy or color original is usually made separately with red, green, and blue light, and the three records so produced are thereafter printed with cyan, magenta and yellow ink, respectively, to produce a printed reproduction of the color original.

In the past, in making direct, color-separation, half-tone negatives from an original color work such as a color transparency or a reflection type copy, it was common practice to use a cross-line or neutral contact screen in making all three separation half-tone negatives.

In making a direct half-tone separation with red light, the red light was projected through the color copy, which for the purposes of illustration, is assumed to be a transparency, the neutral contact screen and onto a piece of light sensitive film. As the red light could not pass through the opaque areas of the screen, but could only pass through the clear areas therebetween, the effect was to produce a series of dots on the processed film. These dots would all be of the same density, but would differ in diameter depending upon the intensity of the red light passing through a given clear area or interstice of the screen which, in turn, depended upon the density of the original to red light; i.e., the denser areas of the original would produce smaller dots than the less dense areas. These dots were formed in equally spaced rows upon the processed film, the rows being at substantially right angles to each other.

It will be understood that when I speak of illuminating the color original with light of a given color, such as red, green or blue, that the same result may be obtained by illuminating the color original with white light and placing the proper color filter between the color original and the film which is used to make the half-tone negative. However, for purposes of illustration, I will refer only to the method of illuminating the color original with light of the desired color.

In making a direct, half-tone separation negative with green light, the same procedure as used with red light was followed, except that a new piece of sensitized film was brought into position and green light projected through the color transparency, the neutral contact screen and onto the film. Again, a pattern of intersecting rows of spaced dots would be formed on the negative, varying in diameter as pointed out above. This process was repeated for the blue light color-separation with, of course, a new piece of light sensitive film. This produced three separate half-tone negatives each having upon proper development, rows of intersecting dots thereon. The half-tone negatives were then used in making printing plates for use in the usual color printing operations, as well understood in the art.

However, it was necessary between the red and green light color-separations and between the green and blue light color-separations to rotate either the contact screen or the copy, to shift the axes of the intersecting rows of dots produced on each of the three negatives to prevent the series of dots from coinciding and thus cancelling out one another, or forming an undesired pattern effect, commonly called "moiré," in the final printing operation. This angular rotation of either the screen or copy between the above successive color-separations is quite critical and attempts have been made to insure the proper relative angular rotation by mounting the screen in a special holder which, in turn, may be accurately positioned in front of, or on the film holder in one of several positions. Similar mechanical arrangements have been made to rotate the copy relative to the screen. However, in either case, it is difficult and requires considerable time to obtain the proper angular positioning between successive color-separations.

Attempts have also been made to maintain the proper screen angle for each of the color-separations by the use of three separate screens, each of which is mounted in a special holder which is provided with means for accurately holding the same in position on the film holder. Each screen has its intersecting rows of alternately dense and clear areas at different angles relative to the holder so that the proper screen angle can be obtained by inserting the correct screen for any particular color-light separation. However, this method has its drawbacks in the case of a neutral contact screen in that it is difficult to obtain three screens having identical optical properties. Also, there is a tendency for the operator to use the wrong screen for the particular color-separation.

Another object of the present invention is, therefore, to provide a unitary half-tone screen of the contact or vignette-type which may be used for direct, color-separation work and which eliminates the necessity of rotating either the screen or the copy between successive color-light separations.

Another object is to provide a vignette half-tone screen of the above nature which comprises a plurality of individual screens superimposed at the proper angular relation to one another for forming a single multiscreen, each screen of which is adapted for use in a given color-separation.

A further object is to provide a half-tone contact or vignette-type screen having the above advantages which may be used for all three color-separations and which will have the desired optical properties for each color-separation so as to produce the desired contrast between the three half-tone negatives made from any given color original.

Still a further object is to provide a unitary, half-tone, cross-line screen of the vignette type having the above advantages.

To these and other ends the invention resides in certain improvements and combinations of parts, all as will be hereinafter more fully described, the novel features being pointed out in the claims at the end of the specification.

Figure 1:
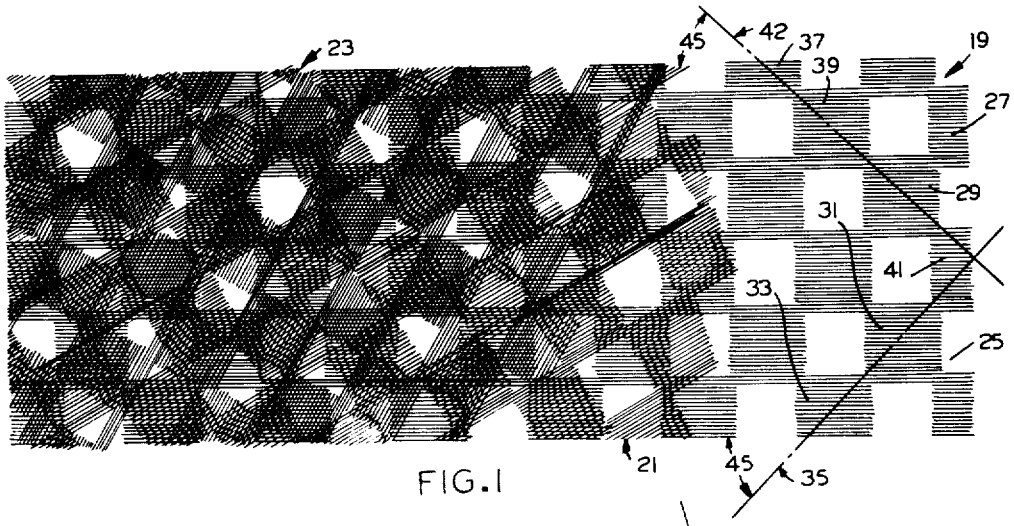
FIG. 1 is a plan view, partly broken away, of a contact type, half-tone screen, embodying the present invention, and showing schematically the separate screen layers therein.

The present embodiment of the invention, herein disclosed by way of illustration, preferably comprises a plurality of individual dye screens shown generally at 19, 21 and 23 which are arranged in superimposed position, as shown in FIG. 1, on a suitable transparent one-piece or laminated supporting member or base 25 which may be of glass, acetate film, or other suitable transparent material. Each screen is optically dense to light of a particular color while being substantially transparent to the remaining portions of the visible spectrum. Each screen is thus dense to a different portion of the spectrum and the three screens are arranged in the desired position of angular rotation relative to one another, as hereafter described. Screens 19, 21 and 23 are preferably formed, one on each of the three layers, respectively, of an integral tri-pack material of the color direct positive type, such as that commercially available for use in making color transparencies, as for example, "Kodachrome" film, or the color negative type such as that commercially available for use in making color negatives, as for example, "Kodacolor" film. This application is a continuation of my co-pending application, Serial No. 388,-126, filed October 26, 1953, now abandoned, Half-Tone Screen for Color Separation.

Figure 2:
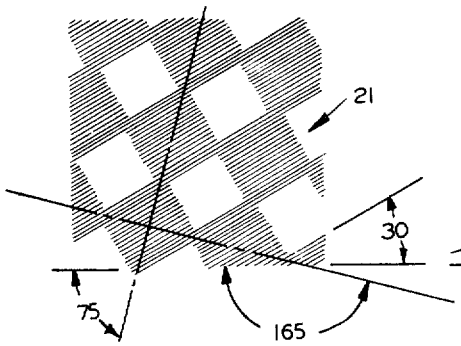
FIG. 2 is a fragmentary top plan view of a portion of a second or middle screen shown in FIG. 1.
Figure 3:
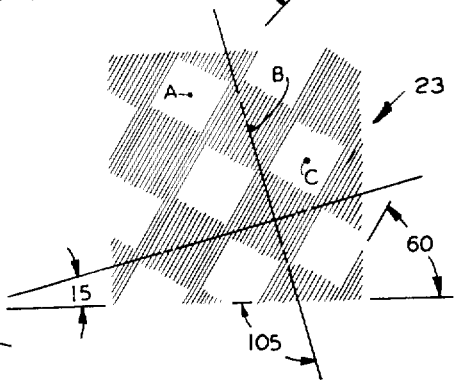
FIG. 3 is a similar view, but showing the third or top screen shown in FIG. 1.

Referring to FIGS. 1–3, it will be noted that each screen is formed with two intersecting series of adjacent parallel zones of substantially discrete, dye-areas for forming each of the screens with a substantially checkerboard-like vignette pattern. Screens 19, 21 and 23 are preferably similar in configuration, but lie in adjacent parallel planes, extend in different directions relative to base 25 and the dyes comprising the solid areas thereof are different from the dyes of each of the other screens, as hereafter more fully described. Therefore, the following detailed description of screen 19 will apply to screens 21 and 23 with the exceptions hereafter noted.

Dye-areas 41, 31 and 33, FIG. 1, which are substantially discrete, form a zone, shown generally at 35, which extends upwardly at substantially a 45° angle to the bottom edge of base 25. Dye-areas 27, 29, 31 and 33 are preferably formed in the shape of squares and are arranged with one of the diagonals thereof extending in the direction of extent of zone 35 and form an overall checkerboard-like pattern, which is clearly visible in FIG. 1. Dye-areas 37, 39, 29 and 41 form a second zone of substantially discrete, aligned dye-areas, shown generally at 42, which intersects the direction of extent of zone 35 at substantially right angles, as shown. It will be seen that for a screen of given size, there is a finite number or series of zones of aligned dye-areas parallel to zone 35 and a finite number or series of zones of aligned dye-areas parallel to zone 42. Although the zones parallel to zone 35 preferably intersect the series of zones parallel to zone 42 at substantially right angles, this is not necessary, for said series of zones may intersect at any desired angle, in which case the aligned dye-areas would be non-square in outline.

Screen 21 is similar in configuration to screen 19, but it is in a separate plane, preferably superimposed on screen 19, and the axes or directions of extent of the intersecting zones of discrete, aligned dye-areas, in each of the series of zones preferably extend at angles of 75 and 165 degrees to the lower edge of base 25.

Screen 23 is similar in configuration to screen 19, but it is in a separate plane superimposed upon screens 21 and 19 and the axes or directions of extent of the zones of substantially discrete, aligned dye-areas preferably extend at angles of 105 and 15 degrees relative to the bottom edge of base 25, as shown in FIG. 3.

In addition to the above differences between screens 19, 21 and 23, I also preferably form the dye-areas of each screen with a dye which is different from the dye in each of the other screens and which has high optical density to light of a given color and low optical density to the remaining portions of the visible spectrum. The dye of each screen has the above high optical density to different portions of the visible spectrum for purposes hereafter pointed out.

Figure 6:
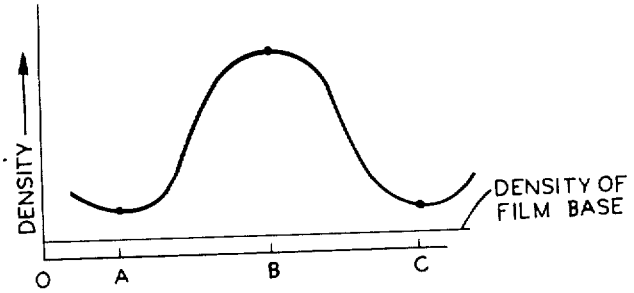
FIG. 6 shows a graph representing the change in density between spaced points along the screen shown in FIG. 3.

Although I have referred to screens 19, 21 and 23 as comprising dye-areas and clear areas, and although an examination of the screens with the aid of a low power magnifying glass would show such a checkerboard pattern as described, and as shown in the drawings, actually the dye in each of the dye-areas is not ordinarily of uniform density, and the clear areas are not ordinarily absolutely clear. That is, referring to FIG. 6, there is shown a graph illustrating a change in density of vignette screen 23 from point A to point C. It will be noted that although points A and C are substantially in the center of the areas which save been referred to as clear areas, they have a density greater than that of the screen base and furthermore, the density increases in directions outwardly from either point A or C in any direction. The density may thus vary from point A to point C, as shown by the continuous curve in FIG. 6, the density being a maximum at point B which is substantially at the center of the intervening dye-area, as shown in FIG. 3. The density of the dye-area is thus not uniform, but may vary, as shown in FIG. 6, and although there is a continuous change between the density of the dye-areas and the adjacent clearer areas, the rate of change is so rapid that the denser areas appear to have sharply defined edges and the screens give substantially the checkerboard appearance shown in the drawings.

Although there are many ways of positioning three individual screens in superimposed position on a transparent support or base, I prefer to use an integral, tri-pack material such as "Kodachrome" or "Kodacolor" film which comprises three individual light-sensitive dye layers on a suitable transparent support. Each of the dye layers is sensitive to light of a different given color and I have found it possible to create a dye screen on each of the three layers, by contact printing a neutral contact screen on each layer with light of the proper color.

That is, for the purposes of illustration, my tri-screen may be readily made on a piece of direct-positive, color film by contact printing a neutral density, contact screen of the above vignette type having the checkerboard pattern similar to that shown in FIGS. 2 or 3 on each of the three layers of dye of the tri-pack material. First the neutral contact screen is preferably printed on the red-sensitive layer by passing red light through the neutral contact screen onto the sensitized tri-pack material. This produces a latent dye-image on the red-sensitive layer which, because the film is of the reverse or direct-positive type will produce, upon proper development, a dye-image of the neutral contact screen in which the dense areas of the neutral contact screen will be represented by substantially the same size areas of cyan dye, and the clear areas of the neutral contact screen represented by clear areas producing, as for example, screen 19 shown in FIG. 1 in which the directions of extent of the intersecting zones of dye-area lie at angles of 45 and 135 degrees to the lower edge of base 25.

This process is repeated by contact printing the neutral contact screen onto the green-sensitive layer of the integral tri-pack material with green light. Here again, upon development there will be produced a dye screen identical to the neutral contact screen, but it will be formed of magenta dye and it will lie in the green-sensitive plane. However, between exposing the red and green layers of the tri-pack material the neutral density contact screen is first very carefully rotated relative to the tri-pack material through the desired angle, which when using a neutral density screen in which the zones of the substantially discrete dye-areas intersect at 90°, would be a rotation of 30°. Thus, it will be seen that upon development, the magenta dye screen will have its axes inclined at 30° to the corresponding axes of the cyan dye screen, and thereby extending at angles of 75 and 165 degrees to the lower edge of base 25. This can be readily seen by a comparison of the positions of screens 21 and 19, as shown in FIGS. 2 and 1, respectively, where screen 19 represents the cyan dye screen and 21 represents the magenta dye screen.

Again, the neutral density screen is contact printed on the integral tri-pack material, but this time with blue light which will create a latent dye-image on the blue-sensitive layer of the tri-pack material similar to the neutral density screen. However, after printing with the green light and before printing with the blue light, the neutral density screen is again rotated relative to the tri-pack material through an angle of 30°, so that upon development, the yellow dye screen produced on the blue-sensitive layer will be at an angle of rotation substantially as shown in FIG. 3 and will have its intersecting zones of dye-area extending at angles of 105 and 15 degrees relative to the bottom edge of base 25, substantially as shown by screen 23 in FIG. 3.

As a result of the above steps, a screen is produced which comprises three individual dye screens, each lying in a separate plane, said planes being parallel, and each screen having its directions of extent at angles substantially 30° to the remaining screens, as shown in FIG. 1. This tri-screen may be transferred to a glass support by merely cementing the acetate base thereto, or it may be transferred by stripping to a suitable glass or transparent plastic base, or it may be sandwiched between two suitable transparent supports, as desired. In any case, however, the use and operation of the screen is the same as presently described. In use, direct, color-separation, half-tone negatives may be now readily produced with my improved screen without the necessity of rotating either the screen or the copy relative to one another between successive color-light separations.

The physical arrangement of the source of light, the path of the light from the original transparency to the copy and the position of the film holder for the light sensitive film may be the same as in the conventional setup, substantially as described in the above exposition of the prior art methods. The neutral contact screen is replaced by my tri-screen, which now may be of the same size as the film, and the various color-light separations are carried out substantially as follows:

Screen 19 which, as stated, comprises alternate squares of cyan dye and clear areas therebetween, has density to red light, while screen 21 which is of magenta dye, and screen 23 which is of yellow dye, are substantially transparent to red light and readily allow the same to pass therethrough. Therefore, only the cyan dye screen, screen 19 is effective when the red-light color separation is made. As the magenta and yellow dye screens have no effect on the red light striking the tri-screen, the red light is allowed to pass through to the cyan dye screen where that which strikes against the solid areas of cyan dye is absorbed while those portions of the red light which strike on the clear areas between the squares, pass through the tri-screen and produce the desired intersecting rows of dots of different diameter on the light sensitive film placed beneath the tri-screen. This is the red light, color-separation and produces the desired half-tone negative which may be used in subsequent color printing operations, in the usual manner.

All that must be done between the red and green-light color-separations is to remove the above half-tone negative, insert a new piece of light sensitive film in the film holder and then project green light through the original transparency, on to my tri-screen and the light sensitive film therebeyond. As the yellow dye screen 23, and the cyan dye screen 19, have low optical density to green light, the green light may readily pass therethrough and only the magenta dye screen 21 will affect the green light. The effect of the magenta screen is similar to that of the cyan dye screen, described above, and it produces on the light sensitive film intersecting rows of dots of different diameter, corresponding to the intensity of the green areas of the original transparency from which the color-separation negatives are being made. However, as a result of the angular position between screens 19 and 21, the rows of dots produced on the second light-sensitive film during the above green-light color separation step will be at the desired 30° angle of rotation relative to the directions of extent of the rows of dots produced on the first light-sensitive film during the red-light color-separation step.

Similarly, all the operator must do between the green and blue-light operations is to put a new piece of light sensitive film into the film holder. Thereafter, the blue light is passed through the transparency, and on to the tri-screen and light-sensitive film. As screens 19 and 21 have low optical density to blue light, only screen 23, which for purposes of illustration, is assumed to be the yellow dye screen, is effective and it will produce the desired intersecting rows of spaced dots on the third piece of light-sensitive film. As screen 23 is at an angle of rotation of 30° relative to screen 21 and at an angle of rotation of 60° relative to screen 19, the directions of extent of the rows of dots produced during the blue-light color-separation step on the third light-sensitive film will be at the desired angles of rotation relative to the rows of dots formed on the second and first light-sensitive films, respectively. That is, the dots formed during the blue-light color-separation will be at an angle of 30° to the direction of extent of the dots formed during the green-light color-separation and at an angle of 60° to the dots formed during the red-light color separation.

Thus, as a result of my novel tri-screen, it is no longer necessary for the operator to rotate either the screen, or copy during the successive color-light separations, for screens, 19, 21 and 23 are at the desired angle of rotation relative to one another and each has the desired optical characteristics. Consequently, my screen insures accurate and uniform results and greatly reduces the time and expense of making direct, color-separation, half-tone negatives.

Figure 4:
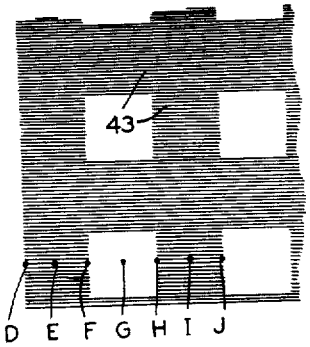
FIG. 4 is a fragmentary plan view of one of the individual screens comprising a half-tone screen, said individual screen having a cross-line pattern.
Figure 7:
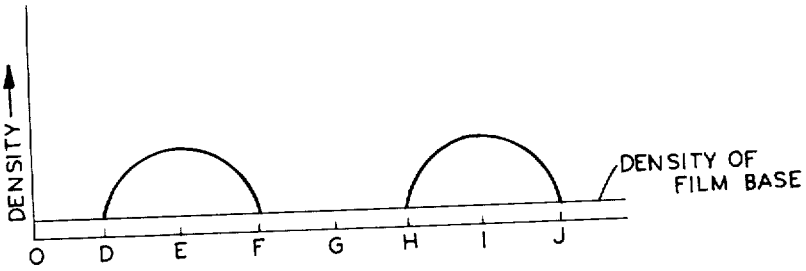
FIG. 7 is similar to FIG. 6 and shows a graph representing the change in density between spaced points along the cross-line screen shown in FIG. 4.

Although the above screen is of the vignette type and is primarily designed for use as a contact screen, the above procedure may readily be used to produce a cross-line screen having a pattern similar to that shown in FIG. 4 comprising intersecting series of closely spaced, adjacent parallel continuous zones or bands of dye 43 having substantially parallel sides. That is, a tri-screen might be produced by the above methods having three superimposed cross-line screens, the axes of extent of which are at the desired relative angles of 30 and 60 degrees, as described above. Such a screen might be produced by substituting a neutral-density, cross-line screen for the neutral-density, vignette screen used in producing the vignette tri-screen described above. Preferably the bands are evenly spaced in each series and the bands of one series intersect the bands of the other series at substantially 90° so that square clear areas are formed between the bands. The clear areas are of the same width as the bands of dye. The bands preferably vary substantially continuously in optical density in a direction transverse to their direction of extent. That is, the density of each band is at a minimum at the edges of the band and at a maximum substantially along the centerline of the band. A graph of the density across a band is shown in FIG. 7 wherein point D is at the left edge of the band, point E at the center and point F at the right edge of the band. A plot of the density across the next successive band is similar to that described above and is represented by the curve H, I, J in which points H, I, J correspond to points D, E, F, respectively. It will be noted that the density from F to H is that of the film base.

The latent screen image of either the vignette or cross-line type may be readily produced by using a commercially available, vignette or cross-line neutral-density screen, as above, or by the methods commonly used in the production of the commercially available vignette and cross-line neutral-density screens. Although I have described the method of making a tri-screen on integral tri-pack color material, it is not necessary that this be used, for either type of screen could be produced by making three separate screens on three pieces of single emulsion film, such as stripping film in which the light-sensitive emulsion is mounted on a thin transparent base which in turn is mounted on a second and heavier transparent base. After each latent screen image is produced and after it has been transformed by development into a dye screen, the dye screen and its thin base may be separated from the heavier base and transferred to the desired transparent support in superimposed position with the other two screens so produced, with the proper angle of rotation between each screen, as set forth above.

The dye screens may also be separately produced, as above, and transferred to the desired transparent support in proper superimposed position by inhibition rather than by stripping.

If either tri-emulsion or single emulsion color film of the color negative or direct positive type is used, the dye screens may be produced from the above latent images by secondary color development as described above.

In secondary color development, the film may have self-contained couplers therein or the film may be developed in a developing solution which contains the desired color couplers as well as the developing agent, as well understood in the art. In addition, I have found it may be desirable to use color films having integral masks. Although the dyes normally found in integral tri-pack materials are satisfactory for use in the production of such screens, a special tri-pack material may be more desirable in which the dyes might not necessarily be good for color reproduction, but which would have the desired optical characteristics described above for use as half-tone screens.

It will be understood that although I have referred to the angle of rotation between the first and second, and second and third screens as preferably being 30°, this is for the purpose of illustration only, for the value of this angle is merely a matter of choice and not a limitation. That is, although it is generally preferred to print with the dot pattern formed when the screens are positioned as above, some may prefer to position successive screens with a relative angle of rotation therebetween other than at 30°. The problem is to insure uniformity during successive color-separations and to accurately position each screen at the preselected angle for the proper color-separation. This, as pointed out above, my screen accomplishes in a novel and highly practical manner. Moreover, although I have stated that each series of zones of dye-area of each of the individual screens preferably intersects the other series of zones of dye-area at substantially 90°, this angle of intersection may be varied, as desired, in which case the angle of relative rotation between the successive screens might be other than the 30° described above in order to produce a satisfactory dot pattern.

I have described a method of making a tri-screen from direct-positive, integral tri-pack color film such as that commercially available under the name "Kodachrome." This same method can be used to make a tri-screen on integral tri-pack color negative film such as that which is commercially available under the name "Kodacolor" film, by the methods described above with the exception that it would be necessary to first make an intermediate negative of the neutral-density, vignette screen or cross-line screen and then contact print the intermediate negative on each emulsion layer of the color negative material in the same manner as described above.

However, it is not necessary that color sensitive film be used, for if the screen is to be built up by the stripping or imbition processes, three separate screens may be made on three pieces of commercially available black and white film, and by the use of a proper color coupler in the developer, the desired colored dye-image screen may be produced on the black and white emulsion along with the silver image and then the silver image bleached-out leaving only the desired colored dye. This could also be done by known methods of dye destruction, dye bleach or dye toning.

A known problem in color reproduction with three colorants is the proper reproduction of the neutral scale. I have found that in the case of color reproduction with half-tones, the proper concentration of the three colors necessary to produce gray may be controlled in two separate ways. The concentrations of the inks used in the final printing may be varied, or the size of the dots produced in making the half-tone negative, may be changed throughout the entire range of the gray scale; that is, by making the same relative change in the size of dots for each tone portion of the scale. Either of the above methods may be used separately or in combination.

However, for reasons other than the reproduction of gray, certain ink concentrations are desirable for adequate printing qualities. Therefore, the use of the first method of changing the visual tone appearance of the neutral scale whereby the ink concentrations are changed is of limited scope and is often undesirable. Consequently, the most desirable way to produce the desired change in the neutral scale is by changing the relative size of the dots.

The size of the dots produced during one color-separation relative to the size of the dots produced during either of the other color separations may be varied, of course, by using a longer or shorter exposure time for the particular color-separation and/or changing the development procedure for that particular half-tone negative. However, these methods of changing the time of exposure and/or development prevent the operator from handling each half-tone in an identical manner and not only prevent setting up a system of mass production, but they increase the complexity of the operation and require an operator having considerable skill in this field.

I have found that it is possible to produce half-tone negatives which not only may be handled in an identical manner with respect to exposure and development, but which, when printed with inks of the desired concentrations, will produce the proper tones of gray throughout the neutral scale. That is, my screen may be so made that each of the three individual screens will have the proper optical characteristics so as to produce the desired contrast and tone reproduction between the three half-tone negatives made from any given color original while allowing the three half-tone negatives to be handled in an identical manner with respect to exposure and development.

With the vignettte-type screen each individual screen is given the desired optical characteristics by changing the slope and/or shape of the density gradient curve of one or more of the individual screens relative to the other screens or screen. This changes the relative size of the dots produced throughout the entire tonal range of that particular color-separation, so that on the final printing with inks of the desired concentration, the neutral scale will be properly reproduced.

With a cross-line screen, the desired contrast between the three half-tones made from a given color original may be produced by changing the distance between the sensitized film upon which the half-tone negative is to be made and the particular screen used for that color-separation. By changing the space between the individual screens comprising my integral, cross-line screen, I am able to automatically produce the desired contrast between the individual color-separations, thereby eliminating both the rational and spacing steps of procedure between successive color-light separations. To this end, an optical screen may be made in which the three individual screens are spaced from one another along the optical axis thereof so as to automatically provide for the proper contrast. Of course, the individual screens are placed at the correct angular position as described above. Such a screen having spaced, individual screens, might comprise three individual dye screens which are separately formed and positioned between stacked, transparent supports by imbibition, or by stripping, or they might be produced on an integral tri-pack material and then removed a layer at a time and positioned between the stacked, transparent supports. In some instances it may be sufficient to produce the screen on integral tri-pack material and sandwich the same as a unit, between cover supports. In this case, the spacing between the screen and film may be varied by adjustment of the camera setting.

In addition, in a cross-line screen the desired contrast between the three half-tones made from a given color original may also be produced by giving each individual screen the proper optical characteristics. This may be done in the same manner as described above for the vignette-type screen wherein the slope and/or shape of the density gradient curve of one or more of the individual screens is changed relative to the density gradient curve of the other screens or screen. This changes the relative size of the dots produced throughout the entire tonal range of that particular color-separation, so that on the final printing with inks of the desired concentration, the neutral scale will be properly reproduced. This procedure of changing the slope and/or density of the gradient curve of one or more of the screens may be used instead of, or in combination with, the spacing between the individual screens, described above, to control the final printing operation.

Figure 5:
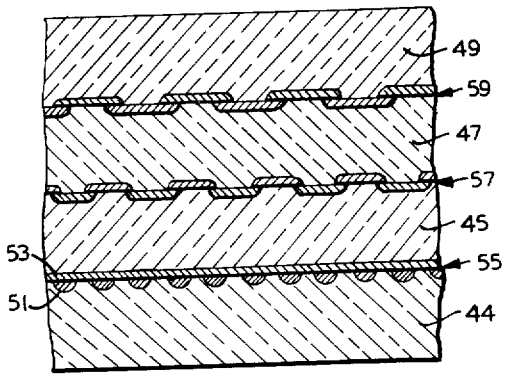
FIG. 5 is a sectional elevation showing a cross-line screen having a modified construction.

An optical screen having the individual screens in spaced relation might also be formed by grooving the adjacent interfaces of a plurality of stacked, transparent supporting members 44, 45, 47, and 49 and then filling the grooves with the desired dye or dye-colored substance, as shown in FIG. 5. To this end, the upper surface of supporting member 44 is formed with a series of closely spaced, parallel grooves, which preferably vary substantially continuously in optical density across the full width thereof, as shown in FIG. 5, and in the same manner as the cross line screen shown in FIG. 4 and described above. Grooves 51 are filled with dye or dye-colored substance, which for the purposes of illustration, may be assumed to be cyan dye. The lower surface of the second supporting member 45 is similarly formed with a series of closely spaced, parallel grooves 53 which are also filled with cyan dye substance and which are positioned so as to have their direction of extent at substantially 90° to the direction of extent of grooves 51 when viewed along the optical axis of the screen. This produces a cross-line screen, shown generally at 55, which has high optical density to red light and low optical density to the remaining portions of the visible spectrum and which will function in a manner similar to that of cyan screen 19, shown in FIG. 1. A similar cross-line screen, shown generally at 57, is produced between the interfaces of members 45 and 47, but it is positioned at an angle of rotation of 30° to screen 55, described above, and the grooves are filled with magenta or yellow dye or dye-colored substances. A similar screen, shown generally at 59, is produced at the adjacent interfaces between members 47 and 49, but its directions of extent are at 60° to the directions of extent of screen 55 and the grooves thereof are filled with either yellow or magenta dye or dye-colored substance, whichever was not used in the grooves of screen 57.

I have referred to vignette and cross-line screens each comprising three individual screens, but it will be understood that one or more additional screens can be added to the three component screens described above by the stripping or imbibition methods described above or, if a cross-line screen, it may be built up between the interfaces of five or more stacked, transparent supports in the same manner as the cross-line screen, shown in FIG. 5. The angle between successive screens would be varied to best adapt the multi-screen to the desired use. In this case, one or more of the screens might have high optical density to light beyond the visible spectrum, such as in the infra-red, or ultra-violet radiation bands.

Thus, it will be seen that my invention provides a novel and practical contact screen, the use of which will greatly facilitate the making of direct, color-separation, half-tone negatives. With my new screen it is no longer necessary to rotate the screen between the successive color-light operations or to remove the same and to substitute a different screen for each color-light separation. As the contact screen is normally drawn into intimate contact with the film holder by means of evacuating the space therebetween, this results in a considerable saving of time, in that once the screen is placed in position, color-light separations may thereafter be carried out without any further manipulation or handling of the screen. In addition, my screen insures that the direction of extent of the intersecting rows of dots formed during each color-light separation will be at exactly the proper angle to the direction of extent of the intersecting rows of dots formed during the other color-light separations so that in the final reproduction, i.e., the printing of the multiple-color pictures on a single sheet of paper, there will be no objectionable pattern or moiré.

In addition to eliminating the need for meticulous and time consuming angular adjustments of the screen between successive color-light separations, my screen is so constructed so as to provide the desired contrast for each color-light separation. That is, in the vignette type and cross-line screens each individual screen may be so made that the half-tone negative made therewith will have the desired contrast; i.e., the diameter of the dots produced thereon will be in desired relation to the diameter of the dots produced with the other screens when exposure and development procedures are identical. As a result, the final printing may be done with inks of the desired concentrations and yet will properly reproduce the neutral scale. This may be accomplished while treating all half-tone negatives in an identical manner as to exposure and development, thereby allowing mass production techniques to be employed with the resultant economies.

A further advantage of my construction is that it permits full utilization of the camera back or the film holder to the full extent thereof. That is, in the past, the neutral-density screen could not be as large as the camera back or the film holder, for it had to be rotated on the camera back or film holder and, thus, its longest dimension could not be any greater than the shorter dimension of the film holder. In fact, the screen had to be such that it would be circumscribed by, or fit within the largest circle which, in turn, could be circumscribed by the dimensions of the camera back or film holder. If the camera back or film holder were square and if the screen were circular, the maximum film size would be a square which would lie within the circular limits of the screen. A more drastic limitation on the size of the negative that can be accommodated is brought about by the fact that the only area which is usable is that area which will be covered by the screen in all positions of rotation thereof. With a rectangular screen, this common or usable area is very much smaller than the dimensions of the screen and, in fact, its greatest dimension cannot be greater than the narrower dimension of the screen. With a rectangular camera back or film holder, the proportion of usable area to the total area is even less than above. However, with my novel tri-screen all this is eliminated for the screen may be made the same size as the film holder or camera back and it will allow film to be exposed to the full size of the film holder, and, thus, much larger negatives may be made with a given camera or film holder.

My novel screen has several important advantages over the prior practice of using three separate neutral-density screens and changing screens between successive color-light separations. That is, my screen need only be positioned once and drawn down against the film holder, after which it becomes, in effect, part of the film holder and it automatically insures that the particular screen for any given color-light separation will be in the correct position and will be at the proper angle of rotation relative to the other screens. Not only is it no longer necessary to spend considerable time in changing screens between successive color-light separations, but no longer is there any possibility that the operator may use the wrong screen with a given color-light separation.

My invention also provides a novel cross-line screen which has the above advantages of comprising three separate screens, each optically opaque to light of a given color and each at the proper angle of rotation relative to the other screens so that the necessity for rotating the screen, or the copy board is again eliminated. In addition, my screen insures that only the correct screen will function during the corresponding color-light separation and that it will be at the proper angle relative to the remaining screens. Here again, the screens may be constructed with the desired relative optical contrasts so as to properly reproduce the neutral scale when the plates are printed with inks of the desired concentrations, while allowing the half-tone negatives to be treated in a uniform manner as to exposure and/or development, with the advantages of increased speed and greatly reduced costs. This may be accomplished either by spacing the individual screens along the optical axis of the multi-screen, by adjusting the spacing between the screen and camera film holder by adjustment of the screen holder relative to the camera, or by forming each screen with the proper density gradient. This, of course, makes direct, color-separation, half-tone negatives much easier and far more economical to produce, and they can now be made by a less skilled operator than was heretofore possible.

A further advantage of my novel construction is that once the optical screen is placed in position parallel to the camera film holder, the only adjustment that must be made is the changing of the spacing between the screen and the film holder between successive color-light separations in order to obtain the desired contrast between the three half-tone negatives made from the same color original. As this adjustment of screen to film holder distance is readily made by an adjusting mechanism projecting outwardly through the camera bellows and may be readily and accurately done without the operator having to come into direct contact with the screen, my screen when once positioned, becomes in effect, an integral part of the camera. Of course, where the component screens comprising my unitary cross-line screen are spaced along the optical axis of the multi-screen, or have the proper density gradient curves even this adjustment is not necessary. In either event, the operator does not have to rotate the screen between successive color-light separations, for the proper screen for each color-light separation will automatically affect only that color-light separation, and it will be automatically in the proper angular position relative to the other screens comprising the multi-screen.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A half-tone screen comprising a transparent support, a plurality of superimposed, individual dye screens on said support, each screen comprising intersecting series of adjacent, parallel zones of dye area with the said zones of each screen extending at a predetermined angle of inclination to the direction of extent of the zones of each of the other of said screens, each of said screens having high optical density to light of a given color and low optical density to the remaining light portions of the visible spectrum, each of said screens having said high optical density in respect to a different portion of said spectrum and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the reespective zone, the combined width of said areas of maximum and minimum optical density of each of said zones being less than the full width of the respective zone.

2. A half-tone screen comprising a transparent support, a plurality of superimposed, individual dye screens on said support, each screen comprising intersecting series of adjacent, parallel zones of dye area with the said zones of each screen extending at a predetermined angle of inclination to the direction of extent of the zones of each of the other of said screens, one of said screens having high optical density to red light and low optical density to the remaining light portions of the visible spectrum, each of said other of said screens having high optical density in respect to a different portion of the spectrum and low optical density to red light, and each of said zones having an area of [uniform] maximum optical density symmetrical with the center line thereof and areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

3. A half-tone screen comprising a transparent support, a plurality of superimposed, individual dye screens on said support, each screen comprising intersecting series of adjacent, parallel zones of dye area with said zones of each screen extending at a predetermined angle of inclination to the direction of extent of the zones of each of the other of said screens, one of said screens having high optical density to blue light and low optical density to the remaining light portions of the visible spectrum, each of said other of said screens having high optical density in respect to a different portion of the spectrum and low optical density to blue light, and each of said zones having an area of [uniform] maximum optical density symmetrical with the center line thereof and areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

4. A half-tone screen comprising a transparent support, a plurality of superimposed, individual dye screens on said support, each screen comprising intersecting series of adjacent, parallel zones of dye areas with said zones of each screen extending at a predetermined angle of inclination to the direction of extent of the zones of each of the other of said screens, one of said screens having high optical density to green light and low optical density to the remaining light portions of the visible spectrum, each of said other of said screens having high optical density in respect to a different portion of the spectrum and low optical density to green light, and each of said zones having an area of [uniform] maximum optical density symmetrical with the center line thereof and areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

5. A half-tone screen comprising a pair of spaced transparent supports, a plurality of superimposed individual dye screens positioned between said supports, each screen comprising intersecting series of adjacent parallel zones of dye area with the said zones of each screen extending at a predetermined angle of inclination to the direction of extent of the zones of each of the other of said screens, each of said screens having high optical density to light of a given color and low optical density to the remaining light portions of the visible spectrum, each of said screens having said high optical density in respect to a different portion of said spectrum, and each of said zones having an area of [uniform] maximum optical density symmetrical with the center line thereof and areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

6. A half-tone screen comprising a transparent support, a plurality of spaced superimposed individual dye screens, each screen comprising intersecting series of adjacent parallel zones of dye area with said zones of each screen extending at a predetermined angle of inclination to the direction of extent of the zones of each of the other of said screens, each of said screens having high optical density to light of a given color and low optical density to the remaining light portions of the visible spectrum, each of said screens having said high optical density with respect to a different portion of said spectrum, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

7. A half-tone screen having a plurality of individual dye screens and comprising a plurality of stacked, transparent supporting members having abutting interface surfaces, a series of closely spaced, parallel grooves, formed in each interface surface of each of said members, each series of grooves of each two adjacent series of grooves being positioned at a predetermined angle of inclination to the direction of extent of the other thereof and having deposited in the grooves thereof a dye having high optical density to light of a given color and low optical density to the remaining light portions of the visible spectrum for forming an individual screen, each series of grooves of each screen having its grooves extending at a predetermined angle to the direction of extent of each series of grooves in each of the other of said screens, the dyes in each of said screens having said high optical density with respect to a different portion of said spectrum and low optical density to the remaining light portions of said spectrum, and each of said grooves having an area of [uniform] maximum optical density symmetrical with the center line thereof and varying substantially continuously in optical density from said area of maximum optical density to the edges of said groove in a direction transverse to the direction of extent of the respective groove, the width of said area of maximum density being less than the full width of the respective groove.

8. A half-tone screen having a plurality of individual dye screens and comprising a plurality of stacked transparent supporting members having abutting interface surfaces, a series of closely spaced, parallel grooves, formed in each interface surface of each of said members, each series of grooves of each two adjacent series of grooves being positioned at a predetermined angle of inclination to the direction of extent of the other thereof and having deposited in the grooves thereof a dye having high optical density to light of a given color and low optical density to the remaining light portions of the visible spectrum for forming an individual screen, each series of grooves of each screen having its grooves extending at a predetermined angle to the direction of extent of each series of grooves in each of the other of said screens, the dyes in each of said screens having said high optical density with respect to a different portion of said spectrum, the dye in one of said screens having said high optical density with respect to red light and low optical density to the remaining light portions of said spectrum, and each of said grooves having an area of [uniform] maximum optical density symmetrical with the center line thereof and varying substantially continuously in optical density from said area of maximum optical density to the edges of said groove in a direction transverse to the direction of extent of the respective groove, the width of said area of maximum density being less than the full width of the respective groove.

9. A half-tone screen having a plurality of individual dye screens and comprising a plurality of stacked, transparent supporting members having abutting interface surfaces, a series of closely spaced, parallel grooves, formed in each interface surface of each of said members, each series of grooves of each two adjacent series of grooves being positioned at a predetermined angle of inclination to the direction of extent of the other thereof and having deposited in the grooves thereof a dye having high optical density to light of a given color and low optical density to the remaining light portions of the visible spectrum for forming an individual screen, each series of grooves of each screen having its grooves extending at a predetermined angle to the direction of extent of each series of grooves of each of the other of said screens, the dyes in each of said screens having said high optical density with respect to a different portion of said spectrum, the dye in one of said screens having said high optical density with respect to blue light and low optical density to the remaining light portions of said spectrum, and each of said grooves having an area of [uniform] maximum optical density symmetrical with the center line thereof and varying substantially continuously in optical density from said area of maximum optical density to the edges of said groove in a direction transverse to the direction of extent of the respective groove, the width of said area of maximum density being less than the full width of the respective groove.

10. A half-tone screen having a plurality of individual dye screens and comprising a plurality of stacked, transparent supporting members having abutting interface surfaces, a series of closely spaced, parallel grooves, formed in each interface surface of each of said members, each series of grooves of each two adjacent series of grooves being positioned at a predetermined angle of inclination to the direction of extent of the other thereof and having deposited in the grooves thereof a dye having high optical density to light of a given color and low optical density to the remaining light portions of the visible spectrum for forming an individual screen, each series of grooves of each screen having its grooves extending at a predetermined angle to the direction of extent of each series of grooves in each of the other of said screens, the dyes in each of said screens having said high optical density with respect to a different portion of said spectrum, the dye in one of said screens having said high optical density with respect to green light and low optical density to the remaining light portions of said spectrum, and each of said grooves having an area of [uniform] maximum optical density symmetrical with the center line thereof and varying substantially continuously in optical density from said area of maximum optical density to the edges of said groove in a direction transverse to the direction of extent of the respective groove, the width of said area of maximum density being less than the full width of the respective groove.

11. A half-tone screen having a plurality of individual dye screens and comprising a plurality of stacked, transparent supporting members having abutting interface surfaces, a series of closely spaced, parallel grooves, formed in each interface surface of each of said members, each series of grooves of each two adjacent series of grooves being positioned at substantially right angles to the direction of extent of the other thereof and having deposited in the grooves thereof a dye having high optical density to light of a given color and low optical density to the remaining light portions of the visible spectrum for forming an individual screen, each series of grooves of each screen having its grooves extending at a predetermined angle of inclination to the direction of extent of each series of grooves in each of the other of said screens, the dies in each of said screens having said high optical density with respect to a different portion of said spectrum and low optical density to the remaining light portions of said spectrum, and each of said grooves having an area of [uniform] maximum optical density symmetrical with the center line thereof and varying substantially continuously in optical density from said area of maximum optical density to the edges of said groove in a direction transverse to the direction of extent of the respective groove, the width of said area of maximum density being less than the full width of the respective groove.

12. A half-tone screen comprising a transparent support, a plurality of superimposed, individual dye screens on said support, each screen comprising intersecting series of adjacent, parallel zones of dye, each of said zones comprising a series of substantially discrete, aligned dye areas extending at a predetermined angle of inclination to the direction of extent of the zones of each of the other of said screens, the dye in each of said screens having high optical density to light of a given color and low optical density to the remaining light portions of the visible spectrum, each of said screens having said high optical density in respect to a different portion of said spectrum, and each of said zones having an area of [uniform] maximum optical density symmetrical with the center line thereof and having areas of [uniform] minimum optical density adjacent and parallel to each edge of each of said zones, each of said zones, varying substantially continuously in optical density between said areas of maximum and minimum density in a direction transverse to the direction of extent of the respective zone, the combined width of said areas of maximum and minimum optical density of each of said zones being less than the full width of the respective zone.

13. A half-tone screen comprising a transparent support, a plurality of superimposed, individual dye screens on said support, each screen comprising intersecting series of adjacent, parallel zones of dye, each of said zones comprising a series of substantially discrete, aligned dye areas extending at a predetermined angle of inclination to the direction of extent of the zones of each of the other of said screens, one of said screens having high optical density to red light and low optical density to the remaining light portions of the visible spectrum, each of said other of said screens having high optical density with respect to a different portion of the spectrum and low optical density to red light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

14. A half-tone screen comprising a transparent support, a plurality of superimposed, individual dye screens on said support, each screen comprising intersecting series of adjacent, parallel zones of dye, each of said zones comprising a series of substantially discrete, aligned dye areas extending at a predetermined angle of inclination to the direction of extent of the zones of each of the other of said screens, one of said screens having high optical density to blue light and low optical density to the remaining light portions of the visible spectrum, each of said other of said screens having high optical density with respect to a different portion of the spectrum and low optical density to blue light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

15. A half-tone screen comprising a transparent support, a plurality of superimposed, individual dye screens on said support, each screen comprising intersecting series of adjacent, parallel zones of dye, each of said zones comprising a series of substantially discrete, aligned dye areas extending at a predetermined angle of inclination to the direction of extent of the zones of each of the other of said screens, one of said screens having high optical density to green light and low optical density to the remaining light portions of the visible spectrum, each of said other of said screens having high optical density with respect to a different portion of the spectrum and low optical density to green light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

16. A half-tone screen comprising a pair of transparent supports, a plurality of superimposed, individual dye screens positioned between said supports, each screen comprising intersecting series of adjacent, parallel zones of dye, each of said zones comprising a series of substantially discrete, aligned dye areas extending at a predetermined angle of inclination to the direction of extent of the zones of each of the other of said screens, each of said screens having high optical density to light of a given color and low potical density to the remaining light portions of the visible spectrum, each of said screens having said high optical density in respect to a different portion of said spectrum, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

17. A half-tone screen comprising a transparent support, a plurality of superimposed, individual dye screens on said support, each screen comprising intersecting series of adjacent, parallel zones of dye, each of said zones comprising a band having substantially parallel sides, said series of bands of each screen extending at a predetermined angle of inclination to the direction of extent of the bands of each of the other of said screens, each of said screens having high optical density to light of a given color and low optical density to the remaining light portions of the visible spectrum, each of said screens having said high optical density with respect to a different portion of said spectrum, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

18. A half-tone screen comprising a transparent support, a plurality of superimposed, individual dye screens on said support, each screen comprising intersecting series of adjacent, parallel zones of dye, each of said zones comprising a band having substantially parallel sides, said series of bands of each screen extending at a predetermined angle of inclination to the direction of extent of the bands of each of the other of said screens, one of said screens having high optical density to red light and low optical density to the remaining portions of the spectrum, each of the other of said screens having high optical density in respect to a different portion of the spectrum and low optical density to the remaining portions of the spectrum including red light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zones.

19. A half-tone screen comprising a transparent support, a plurality of superimposed, individual dye screens on said support, each screen comprising intersecting series of adjacent, parallel zones of dye, each of said zones comprising a band having substantially parallel sides, said series of bands of each screen extending at a predetermined angle of inclination to the direction of extent of the bands of each of the other of said screens, one of said screens having high optical density to blue light and low optical density to the remaining portions of the spectrum, each of the other of said screens having optical density in respect to a different portion of the spectrum and low optical density to the remaining portions of the spectrum including blue light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zones.

20. A half-tone screen comprising a transparent support, a plurality of superimposed, individual dye screens on said support, each screen comprising intersecting series of adjacent, parallel zones of dye, each of said zones comprising a band having substantially parallel sides, said series of bands of each screen extending at a predetermined angle of inclination to the direction of extent of the bands of each of the other of said screens, one of said screens having high optical density to green light and low optical density to the remaining portions of the spectrum, each of the other of said screens having high optical density in respect to a different portion of the spectrum and low optical density to the remaining portions of the spectrum including green light, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zones.

21. A half-tone screen comprising a pair of transparent supports, a plurality of superimposed, individual dye screens positioned between said supports, each screen comprising intersecting series of adjacent, parallel zones of dye, each of said zones comprising a band having substantially parallel sides, each series of bands of each screen extending at a predetermined angle of inclination to the direction of extent of the bands of each of the other of said screens, each of said screens having high optical density to light of a given color and low optical density to the remaining light portions of the visible spectrum, each of said screens having said high optical density with respect to a different portion of said spectrum, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

22. A half-tone screen comprising a plurality of stacked, transparent supporting members, a plurality of superimposed, individual dye-screens positioned between said members, each screen comprising intersecting series of adjacent parallel zones of dye, each of said zones comprising a band having substantially parallel sides, said series of bands of each screen extending at a predetermined angle of inclination to the direction of extent of the bands of each of the other of said screens, each of said screens having high optical density to light of a given color and low optical density to the remaining portions of the spectrum, each of said screens having said high optical density with respect to a different portion of said spectrum, each of said individual screens being spaced from one another along the optical axis of the composite screen for providing the desired contrast between different color-light separations, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full wdith of the respective zone.

23. A half-tone screen comprising a plurality of stacked, transparent supporting members, a plurality of superimposed, individual dye-screens positioned between said members, each screen comprising intersecting series of adjacent parallel zones of dye, each of said zones comprising a band having substantially parallel sides, said series of bands of each screen extending at a predetermined angle of inclination to the direction of extent of the bands of each of the other of said screens, one of said screens having high optical density to red light and low optical density to the remaining portions of the spectrum, each of the other of said screens having a high optical density with respect to a different portion of the spectrum and having low optical density to the remaining portions of the spectrum including red light, each of said individual screens being spaced from one another along the optical axis of the composite screen for providing the desired contrast between different color-light separations, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

24. A half-tone screen comprising a plurality of stacked, transparent supporting members, a plurality of superimposed, individual dye-screens positioned between said members, each screen comprising intersecting series of adjacent parallel zones of dye, each of said zones comprising a band having substantially parallel sides, said series of bands of each screen extending at a predetermined angle of inclination to the direction of extent of the bands of each of the other of said screens, one of said screens having high optical density to green light and low density to the remaining portions of the spectrum, each of the other of said screens having a high optical density with respect to a different portion of the spectrum and having low optical density to the remaining portions of the spectrum including green light, each of said individual screens being spaced from one another along the optical axis of the composite screens for providing the desired contrast between different color-light separations, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and minimum optical density of each of said zones being less than the full width of the respective zone.

25. A half-tone screen comprising a plurality of stacked, transparent supporting members, a plurality of superimposed, individual dye-screens positioned between said members, each screen comprising intersecting series of adjacent parallel zones of dye, each of said zones comprising a band having substantially parallel sides, said series of bands of each screen extending at a predetermined angle of inclination to the direction of extent of the bands of each of the other of said screens, one of said screens having high optical density to blue light and low optical density to the remaining portions of the spectrum, each of the other of said screens having a high optical density with respect to a different portion of the spectrum and having low optical density to the remaining portions of the spectrum including blue light, each of said individual screens being spaced from one another along the optical axis of the composite screen for providing the desired contrast between different color-light separations, and each of said zones having an area of [uniform] maximum optical density symmetrical with the center line thereof and having areas of [uniform] minimum optical density adjacent and parallel to each edge of each of said zones, each of said zones varying substantially continuously in optical density between said areas of maximum and minimum density in a direction transverse to the direction of extent of the respective zone, the combined width of said areas of maximum and mimimum optical density of each of said zones being less than the full width of the respective zone.

References Cited by the Examiner

The following references, cited by the Examiner, are of record in the patented file of this patent or the original patent.

UNITED STATES PATENTS

| | | | |
|---|---|---|---|
| 561,132 | 6/1896 | Roche | 96—117 |
| 1,919,483 | 7/1933 | Rowell | 96—117 |
| 2,093,063 | 9/1937 | Wesstrom et al. | 96—45 |
| 2,285,262 | 6/1942 | Fess et al. | 88—24 |
| 2,304,988 | 12/1942 | Yule | 129—1 |
| 2,674,649 | 4/1954 | Wetzel | 178—5.4 |

FOREIGN PATENTS

| | | |
|---|---|---|
| 6,098 | 10/1907 | Great Britain. |
| 483,059 | 10/1937 | Great Britain. |

OTHER REFERENCES

Grady: "The Photo-Engravers Bulletin, "November 1946, pp. 63–71 (page 66 particularly relied on).

NORMAN G. TORCHIN, *Primary Examiner.*

RONALD H. SMITH, *Assistant Examiner.*